April 12, 1966  N. DE CLARIS ETAL  3,246,295

SCANNER

Filed Dec. 14, 1959  2 Sheets-Sheet 1

INVENTOR.
NICHOLAS DE CLARIS
MELVIN F. SILVERSTEIN
BY
Ezekiel Wolf, Wolf + Greenfield
ATTORNEYS April 12, 1966     N. DE CLARIS ETAL     3,246,295

SCANNER

Filed Dec. 14, 1959     2 Sheets-Sheet 2

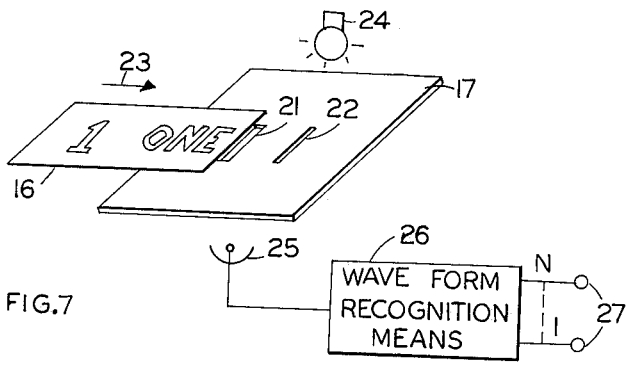

FIG.7

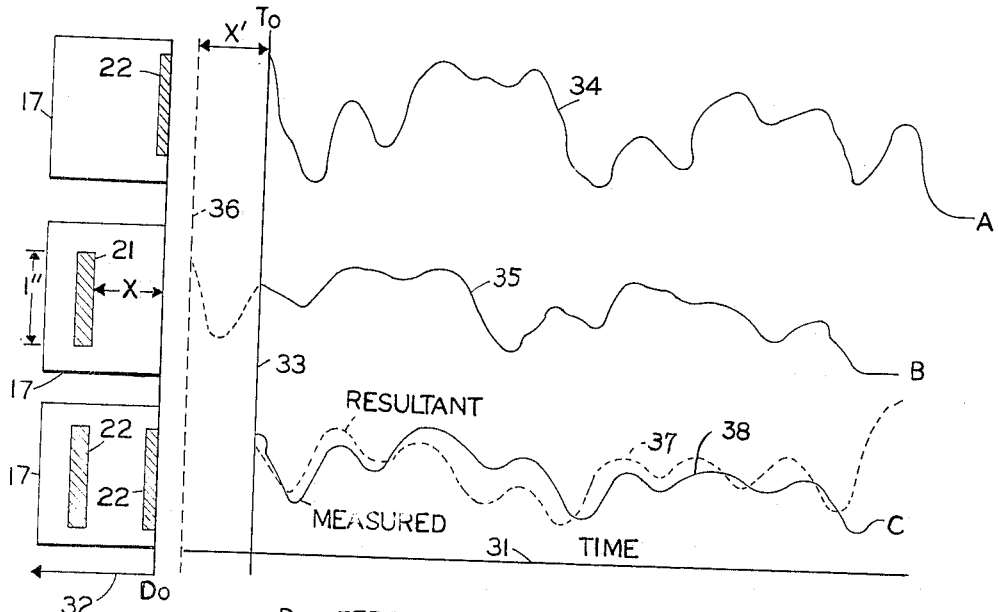

FIG.8

$D_o$ – ZERO DISTANCE AXIS. BILL IS POSITIONED IN RELATION TO THIS POINT $T_o$ – ZERO TIME AXIS

X – DISTANCE IN INCHES THAT SAMPLING WINDOW IS SHIFTED FROM $D_o$

X' – DISTANCE ON TIME AXIS THAT CURVE IS SHIFTED FOR COMBINATION WITH UNSHIFTED CURVE. X'=KX SINCE TIME AND DISTANCE AXIS ARE NOT IN SAME UNITS.

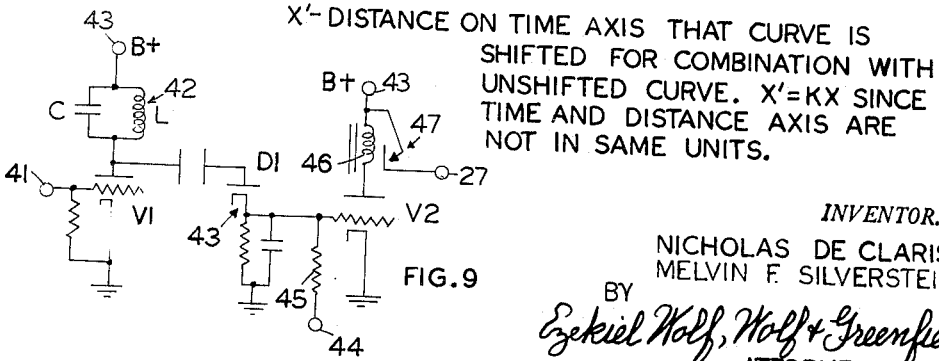

FIG.9

*INVENTOR.*
NICHOLAS DE CLARIS
MELVIN F. SILVERSTEIN
BY
*Ezekiel Wolf, Wolf + Greenfield*
ATTORNEYS United States Patent Office 3,246,295
Patented Apr. 12, 1966

3,246,295
SCANNER
Nicholas De Claris, Ithaca, N.Y., and Melvin F. Silverstein, Holbrook, Mass.; said De Claris assignor, by mesne assignments, to Arcs Industries, Inc., Huntington Station, N.Y., a corporation of New York, and said Silverstein assignor to Rescon Electronics Corp., Boston, Mass., a corporation of Delaware
Filed Dec. 14, 1959, Ser. No. 859,451
3 Claims. (Cl. 340—146.3)

The present invention relates in general to identification systems and more particularly concerns a novel system for providing an indication of the presence of a predetermined characteristic in a scanned object. The invention has specific utility in connection with the recognition of different denominations of paper currency. In a specific embodiment utilized for this purpose, relatively few inexpensive components are combined in a system which provides a reliable indication of the denomination of a bill.

The present invention contemplates and has as an important object the provision of a system for identifying a predetermined characteristic in a scanned object.

It is another object of the invention to achieve the foregoing object with a minimum of apparatus.

It is still another object of the invention to minimize the effort required to prepare means capable of yielding a distinct output signal when a predetermined characteristic is present in a scanned object.

It is still a further object of the invention to utilize standard components in the system achieving the foregoing objects with some of said components performing multiple functions to reduce the number required.

It is a specific object of the invention to provide a system capable of identifying paper currency of a predetermined denomination.

According to the invention, an object, such as a currency note, is scanned to derive a plurality of different signals waveforms which are combined to provide a single output signal waveform having a predetermined shape only when a predetermined characteristic, such as a particular bill denomination, is present in the scanned object.

Other features, objects and advantages of the invention will become apparent from the following specification when read in connection with accompanying drawing in which:

FIG. 1 diagrammatically represents a light source masked from a photoelectric device by a mask;

FIG. 7 is a combined block-pictorial diagram illustrating a preferred embodiment of the invention in which the scanning means includes spaced slits;

FIG. 8 shows scanning signal waveforms derived from different slit arrangements helpful in understanding a preferred manner of preparing a scanning mask to yield an output signal by cumulatively combining different scanning signals which contain a unique and appropriate waveform only when a predetermined characteristic is present in the scanned object; and FIG. 9 is a schematic circuit diagram illustrating a suitable means for recognizing an output signal having regularly spaced maxima, as the appropriate waveform.

Before considering specific apparatus for practicing the invention, it is helpful to consider the theoretical principles which explain the mode of operation of the invention.

The invention concerns the recognition of optical patterns (such as money) converted into electrical signals for that purpose. The novel method by which the "light" patterns are converted into electric signals not only influences the generation of the signals (electric) built can be adapted to exaggerate or "filter" predetermined characteristics of one or more optical patterns thus simplifying the subsequent problems of patterns recognition.

Figure 1:
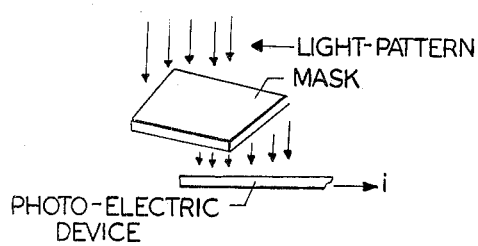

Referring to FIG. 1, let the light, reflected or transmitted, through a pattern, be represented by a density function $S(x, y)$ where $x$ and $y$ are plane co-ordintaes. $S(x, y)$ represents the relative degree of darkness or lightness at various points of the pattern. Now, suppose that this light-pattern passes through a mask which has density variations $W(x, y)$ (with the same reference axis) producing an electrical current $i$ in a photo-electric device, the current $i$ can then be represented as $$i = \oint KS(x, y) W(x, y) dx dy \qquad (1)$$

where $W(x, y)$ receives values between 0 and 1 corresponding to the limits of no and total light transmission, respectively; $K$ is a factor depending on the photo-electric device, and the closed integral is over the surface of the photo-electric device. In the case where the non-zero values of $W(x, y)$ fall within an area smaller than that of the photo-electric device, the surface integral can be taken over the area of the mask.

Figure 2:
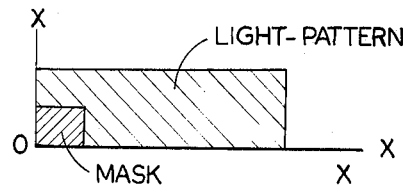
FIG. 2 is a diagram of a mask and light pattern oriented in a rectangular coordinate system.

The current $i$ (Eq. 1) is an average quantity (D.C.). If now the light density pattern is translated with constant velocity $c$ along the negative $x$-direction, then the integral of Eq. 1 becomes $$i(t) = \oint KS(x-ct) W(x, y) dx dy \qquad (2)$$

where the reference location of $S$ at rest is as shown in FIG. 2.

Figure 3:
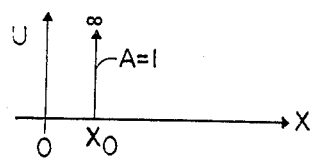
FIG. 3 shows a unit impulse displaced from the origin.

The integral of Eq. 2 transforms the average space variations (along the $x$-coordinate) of $S$ into "time" variations in $i$ weighted by the function $W$. Assume that pattern characteristics along $x$ only are of interest. This, for example, is the case when $y$ variations are non-existent or insignificant. Then, Eq. 2 takes the form:

$$i(t) = \int_a^b Ms(x-ct) W(x) dx \qquad (3)$$

where the appropriate changes of symbols was made to express the one-dimensional character of the integral. Suppose that $$w(x) = u_0(x - x_0)$$

where $u_0(x)$ is a unit impulse of area 1 (FIG. 3), then according to Eq. 3, $$i(t) = Ks(ct - x_0) \qquad (4)$$

The physical interpretation of $s(x)$ is the electrical time response when the mask is represented by a unit impulse (the question of time delay is not important at this time).

Figure 4A:
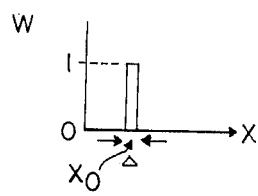
FIG. 4A shows a practical approximation of a unit impulse.
Figure 4B:
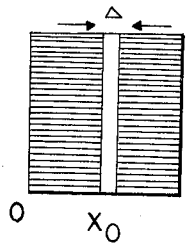
FIG. 4B shows a mask with a light transmissive slit approximating a unit impulse.

In practice, however, the unit impulse can only be approximated by the mask as a narrow pulse, as shown in FIGS. 4A and 4B. Thus, $$w(x) = p(x)$$

where $$\frac{p(x)}{\Delta} = u_0(x)$$

The pulse width $\Delta$ limits the $x$-direction variations of $S$ that may be "recognized," so that—

$$i(t) \approx K's(ct - x_0) \qquad (5)$$

where K' replaces K to account for the decrease in area.

Figure 5:
FIG. 5 shows a mask with a number of spaced light transmissive slits.

Now, if the weighting function is a train of impulses of area $a_i$ at spaced locations $x_i$ (realized approximately by the mask as a "window" function, (FIG. 5) since, $$w(x) = \sum_{i=1}^{n} a_i p(x-x_i) \quad (6)$$

then $$i(T) = \sum_{k=i}^{n} k_i s(x-x_i) \quad (7)$$

or $$i(T) = A_1 i_o(t-T_1) + A_2 i_o(t-T_2) + \ldots \quad (8)$$

where $i_o(t)$ is the response due to an individual "window."

Since the response due to each scanning slit is representable by a convolution integral in which the kernel includes the same time function delayed by a time increment $T_i$ related to the position of the respective window, by the use of Laplace transforms, Equation 8 may be transformed into $$I(s) = I_o(s)[A_1 e^{sT_1} + A_2 e^{sT_2} + \ldots] \quad (9)$$

where $s$ is the complex frequency variable.

From Equ. 4, since $$I_o(s) = KS(s)$$

introducing the co-efficients $\mu_i$ (depending on the window area) we now have $$I(s) = S(s)[\mu_1 e^{sT_1} + \mu_2 e^{sT_2} + \ldots] \quad (10)$$

Thus, the function $$F(s) = \mu_1 e^{sT_1} + \mu_2 e^{sT_2} + \ldots$$

established by the mask windows may be used, by appropriately selecting values of $\mu_i$ and $T_i$, to optimize the extraction of the essential pattern characteristics of a given set of patterns $S_1, S_2, S_n$, provided that they exist.

The analytical technique just presented provides the basis of mask synthesis (selection of $a_i$ and $x_i$) for pattern recognition purposes. Since only the relative motion of S and W are important for the generation of $i(T)$, Eq. (3) can be written also as $$i(t) = \int Ms(x) W(x-ct) dx$$

There is an additional feature of generating the useful signal $i(t)$ through an appropriate $w(x)$. That is the improvement of signal to noise ratio. Usually, in addition to the useful signal $i(t)$ in the photo-electric device, there is also some noise $n(t)$ generated by the photo-electric device itself. While the mean square value of $n(t)$ is fixed, that is $$n^2(t) = \text{constant}$$

the mean square value of the signal used for recognition through filtering of $i(t)$ depends on $w(t)$ and thus can be increased.

Figure 6:
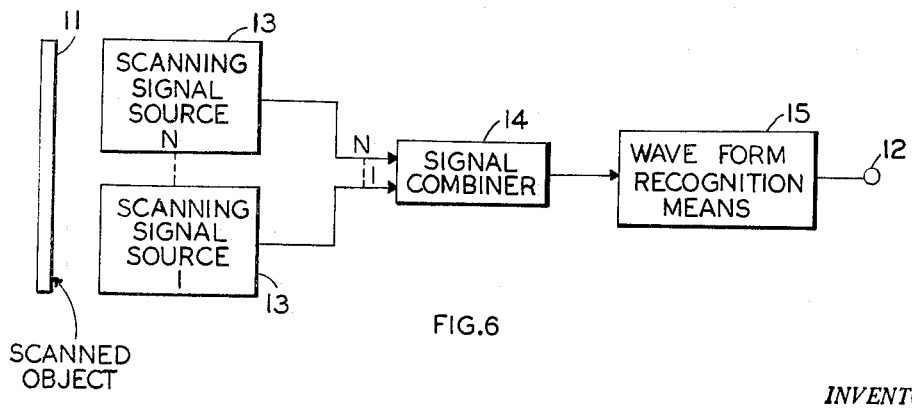
FIG. 6 is a block diagram generally illustrating the logical arrangement of a system arranged according to the invention.

With reference now to FIG. 6 of the drawing, there is shown a block diagram generally illustrating the logical arrangement of an exemplary system for practicing the invention. If the scanned object 11 has a predetermined characteristic, an output signal is provided on terminal 12. As the object 11 is scanned, each of the scanning signal sources 13 provide an output signal. These scanning signals are combined in signal combiner 14 to provide a single output signal. This output signal has a predetermined shape only when the predetermined characteristic is present in the scanned object 11. The signal output of signal combiner 14 is applied to the waveform recognition means 15 to provide an output signal on terminal 12 only when the said predetermined shape is sensed.

Referring to FIG. 7, there is shown a combined block-pictorial diagram illustrating a preferred embodiment of the invention for recognizing the different denominations of paper currency. The scanned object is a dollar bill 16. An opaque mask 17 is formed with two slits 21 and 22 oriented transversely with respect to the direction of relative movement between the bill 16 and the opaque mask 17 as indicated by the arrow 23. A light source 24 directs a beam of light through the slits 21 and 22 through photoelectric transducing means, such as the photocell 25. The output of photocell 25 is delivered to the waveform recognition means 26 which delivers an output signal on that one of the output terminals 27 associated with the denomination of the bill being scanned. In many specific applications, such as in a dollar dispensing machine, it will be necessary to recognize only a single denomination so that the waveform recognition means 26 will have but a single output terminal.

The particular means for supporting the mask, light source and photocell and the means for imparting relative motion between the bill 16 and the mask 17 are not a part of this invention and may be accomplished by any well-known means. Such means are not illustrated in FIG. 7 in order to avoid obscuring the principles of the present invention.

Referring to FIG. 8, there is illustrated actual signal waveforms derived by scanning the central longitudinal section of a dollar bill through the slits in the opaque mask shown immediately to the left of each waveform. Horizontal axis 31 is a time axis while the horizontal axis 32 is representative of distance measured from the vertical reference axis $D_0$ corresponding to the right edge of split 22. The vertical axis 33 corresponds to a time $T_o$ when the right edge of bill 16 coincides with the right edge of slit 22. As the bill 16 is translated at uniform velocity across the transparent areas in mask 17, the waveform immediately to the right of each mask is provided at the output of photocell 25.

FIG. 8A shows the waveform 34 derived by scanning a dollar bill through a slit 22 one inch long and ⅛ inch wide with the central longitudinal section of the dollar bill passing over the slit.

FIG. 8B shows a signal waveform derived under similar conditions with the exception that the slit 21 is ¼ inch wide with its right edge spaced a distance $x$ to the left of $D_0$. The time interval required for the bill to travel the distance $x$ is designated $x'$. The broken vertical axis 36 is displaced to the left of axis 33 by a time interval $x'$ and the portion of the waveform derived in the interval between axes 36 and 33 is shown as a broken line. By appropriately choosing the distance $x$, the cumulative combination of the waveform 34 and 35 will have substantially regularly spaced maxima when a dollar bill is being scanned while the resultant derived from scanning other denominations will not include such regularly spaced maxima, or at worst, some regularly spaced maxima separated by an appreciably different time interval. Thus, the waveform derived from scanning a dollar bill distinguishable from other scanning-derived signal waveforms.

In FIG. 8C, the signal waveform 37, shown as a broken line, is the resultant derived from graphically adding signal waveforms 34 and 35 to the right of axis 33 when the distance $x$ is ¾ inches. Signal waveform 38 is the actually measured resultant derived from scanning a two dollar bill with slits 21 and 22 arranged with that value of $x$. The signal waveforms shown in FIG. 8C may be resolved into a random signal and a waveform containing a series of sinusoidal cycles whose fundamental period is substantially equal to the time interval between consecutive maxima. Such a series of sinusoidal cycles is substantially the equivalent of a sine wave modulated by a rectangular pulse. It can be shown that if a current containing such a waveform is applied to applied to a parallel resonant circuit having a capacitance C shunted by an inductance L and a resistance R, the output voltage thereacross is a series of sinusoidal cycles having the same period with an exponentially rising and decaying envelope if the resonant frequency of the tuned circuit is the reciprocal of the period of the individual sinusoidal cycles. The amplitude of the output voltage is proportional to the shunt resistance while the time constant of the exponential rising and decaying waveform is 2RC.

Referring to FIG. 9, there is shown a schematic circuit diagram of a circuit which may take advantage of this property to provide an output indication only when a dollar bill is scanned. This circuit includes an amplifier tube V1, a diode detector D1 and a relay control tube V2. The output of photocell 25 is applied to the grid terminal 41 of tube V1. The plate circuit of tube V1 includes a tuned circuit 42 in series with the B+ terminal 43 and having a resonant frequency substantially equal to the reciprocal of the time interval between consecutive maxima of waveform 38.

When the waveform 38 is applied to the grid input terminal 41, a relatively large voltage is developed across the tuned circuit 42 and coupled to the diode detector circuit 43. Tube V2 is maintained normally nonconductive by the negative potential coupled from terminal 44 to its grid through resistor 45. When detector 43 senses the large signal across tuned circuit 42, it develops a potential sufficiently large to render tube V2 conductive. Tube V2 then draws plate current from B+ terminal 43 through relay coil 46 to close the contacts 47 and provide the B+ potential on terminal 27 which may be used to activate an indicating means or utilization device.

Since it is desired that the envelope of the voltage developed across tuned circuit 42 rise as rapidly as possible, the capacitance C should be as low as practicable, and preferably the shunt capacitance across the physical inductor L. The shunt resistance across the tuned circuit is primarily the plate resistance of the tube V1.

There has been described novel apparatus and techniques for identifying the presence of a predetermined characteristic in a scanned object. The particular apparatus described herein, while advantageous because of the simplicity of its construction is by way of example only. It is possible to use different scanning techniques, different slit orientations, shapes and sizes, numerous photoelectric transducing means, other more sophisticated waveform analyzers, and other specific circuit arrangements. Numerous other modifications of and departures from the specific apparatus and techniques described herein may be practiced by those skilled in the art without departing form the inventive concepts. Consequently, the invention is to be construed as limited only by the spirit and scope of the appended claims.

What is claimed is:
1. Apparatus for recognizing a document comprising means for determining the light transmission characteristics of said document, said light transmission determining means comprising, means for illuminating said document, means for sequentially sampling the light transmitted through said document representing the optical density thereof to derive a plurality of signals each representative of the integral of the product of respective time-spaced impulses with a common time function representative of the optical density characteristics of said documents, and means for combining said plurality of signals to provide an output signal characterized by a waveform representative of the light transmission characteristics of said document.

2. Apparatus in accordance with claim 1 and further comprising means responsive to said output signal for providing a recognition signal to indicate a presence of a predetermined waveform.

3. Apparatus as defined in claim 1 wherein said light sampling means comprises a single photocell.

References Cited by the Examiner
UNITED STATES PATENTS

| | | | |
|---|---|---|---|
| 2,413,349 | 12/1946 | Hancock et al. | 88—1 |
| 2,651,771 | 9/1953 | Palmer | 88—1 |
| 2,663,758 | 12/1953 | Shepard | 340—146.3 X |
| 2,894,247 | 7/1959 | Relis | 340—149.1 |
| 2,930,899 | 3/1960 | Lyon et al. | |
| 2,932,392 | 4/1960 | Burtner et al. | 194—4 |
| 2,937,283 | 5/1960 | Oliver. | |
| 3,031,076 | 4/1962 | De Claris et al. | 88—14 |
| 3,088,096 | 4/1963 | Steinbuch | 340—146.3 |
| 3,089,122 | 5/1963 | Seehof et al. | 340—146.3 |

MALCOLM A. MORRISON, *Primary Examiner.*

EVERETT R. REYNOLDS, NEIL C. READ, IRVING L. SRAGOW, *Examiners.*

J. W. DORITY, G. E. MEYERS, S. M. URYNOWICZ,
*Assistant Examiners.*